United States Patent
De Lima, Jr. et al.

(10) Patent No.: US 11,625,360 B2
(45) Date of Patent: Apr. 11, 2023

(54) TAILORING CONTAINER IMAGES TO A SPECIFIC MICROARCHITECTURE IN VIRTUALIZED ENVIRONMENTS

(71) Applicant: Kyndryl, Inc., New York, NY (US)

(72) Inventors: Juscelino Candido De Lima, Jr., Campinas (BR); Breno H. Leitao, Araraquara (BR); Fabio M. Tanada, Campinas (BR)

(73) Assignee: Kyndryl, Inc., New York, NY (US)

( * ) Notice: Subject to any disclaimer, the term of this patent is extended or adjusted under 35 U.S.C. 154(b) by 210 days.

(21) Appl. No.: 16/012,928

(22) Filed: Jun. 20, 2018

(65) Prior Publication Data

US 2019/0392045 A1     Dec. 26, 2019

(51) Int. Cl.
  *G06F 16/11* (2019.01)
  *G06F 12/0802* (2016.01)
  *G06F 9/455* (2018.01)

(52) U.S. Cl.
  CPC ........ *G06F 16/128* (2019.01); *G06F 9/45558* (2013.01); *G06F 12/0802* (2013.01)

(58) Field of Classification Search
  None
  See application file for complete search history.

(56) References Cited

U.S. PATENT DOCUMENTS 7,356,679 B1    4/2008  Le et al.
8,601,473 B1 *  12/2013 Aron ..................... G06F 9/5088
                                                            718/1

(Continued)

FOREIGN PATENT DOCUMENTS

WO   WO 2016195562    12/2016

OTHER PUBLICATIONS

Tost et al., Build and Extend Docker Container Images With Middleware Functions, Source: Published on Aug. 22, 2016, Retrieved from Internet: URL: https://www.ibm.com/developerworks/library/mw-1608-tost-trs/index.html, 15 pages.

(Continued)

*Primary Examiner* — Ashish Thomas
*Assistant Examiner* — Mellissa M. Ohba
(74) *Attorney, Agent, or Firm* — Dan Housley; Hunter E. Webb; Keohane & D'Alessandro, PLLC

(57) ABSTRACT

A system and method for tailoring container images stored in a container image registry to a specific microarchitecture that a host operating system is running on in a virtualized environment. A container image fetch request is sent to the container image registry. Microarchitecture identification instructions are received from the image registry in response to the container image fetch request. Results from the microarchitecture identification instructions are transmitted to the container image registry to identify the specific microarchitecture that the host operating system is running on in the virtualized environment, and a container within the virtualized environment is started using an optimal container image received from the container image registry, the optimal container image being tailored to the specific microarchitecture to leverage the functionalities and capabilities of the specific microarchitecture of the computing system.

20 Claims, 8 Drawing Sheets

(56) References Cited

U.S. PATENT DOCUMENTS

| | | | |
|---|---|---|---|
| 8,887,056 B2* | 11/2014 | Breternitz | G06F 9/505 |
| | | | 715/735 |
| 9,075,638 B2 | 7/2015 | Barnett et al. | |
| 9,152,532 B2* | 10/2015 | Breternitz | G06F 11/3495 |
| 9,355,248 B1 | 5/2016 | Wiest et al. | |
| 9,367,305 B1* | 6/2016 | Kumar | G06F 8/71 |
| 2005/0060722 A1 | 3/2005 | Rochette et al. | |
| 2014/0047095 A1* | 2/2014 | Breternitz | G06F 9/5072 |
| | | | 709/224 |
| 2014/0047272 A1* | 2/2014 | Breternitz | G06F 11/3495 |
| | | | 714/32 |
| 2015/0067651 A1* | 3/2015 | Hoffmann | G06F 11/323 |
| | | | 717/125 |
| 2016/0330277 A1 | 11/2016 | Jain et al. | |
| 2016/0359955 A1 | 12/2016 | Gill et al. | |
| 2017/0147335 A1* | 5/2017 | Parees | G06F 8/71 |
| 2017/0177860 A1* | 6/2017 | Suarez | G06F 21/31 |
| 2017/0177877 A1* | 6/2017 | Suarez | G06F 16/188 |
| 2017/0264684 A1* | 9/2017 | Spillane | H04L 67/1095 |
| 2017/0366616 A1* | 12/2017 | Rodrigues Nascimento | |
| | | | H04L 67/34 |
| 2017/0372247 A1* | 12/2017 | Tauber | G06F 11/3668 |
| 2018/0196654 A1* | 7/2018 | Bo | G06F 8/60 |
| 2018/0285563 A1* | 10/2018 | Browne | G06F 21/53 |
| 2019/0347121 A1* | 11/2019 | Luo | G06F 8/63 |

OTHER PUBLICATIONS

Karl Isenberg, Platform Architecture for the Container-Centric Datacenter, Source: Aug. 11, 2016, Retrieved from Internet: URL: https://mesosphere.com/blog/2016/08/11/datacenter-platform-architecture/, 16 pages.

Liang et al., HDID: an Efficient Hybrid Docker Image Distribution System for Datacenters, Source: Jan. 17, 2017, Retrieved from Internet: URL: http://link.springer.com/chapter/10.1007/978-981-10-3482-4_13, 3 pages.

Mell, Peter et al.; "The NIST Definition of Cloud Computing;" National Institute of Standards and Technology; Special Publication 800-145; Sep. 2011; 7 pages.

Multi-architecture support in content manifest scheme version 2—GitHub; Multi-arch Implementation.md; Instantly share code, notes, and snippets, retrieved from internet: https://gist.github.com/estesp/a3546f3cf24d2fc9cecc; retrieved on May 25, 2017; 3 pages.

* cited by examiner

TAILORING CONTAINER IMAGES TO A SPECIFIC MICROARCHITECTURE IN VIRTUALIZED ENVIRONMENTS

TECHNICAL FIELD

The present invention relates to systems and methods for tailoring container images for instantiating a container in a virtualized environment, and more specifically the embodiments of a container image system and method for tailoring container images stored in a container image registry to a specific microarchitecture that a host operating system is running on in a virtualized environment.

BACKGROUND

In containerized environments, a distribution image created for a particular architecture (e.g. x86_64) cannot be virtualized on a power architecture, even if it shares the same kernel source. To reassemble an image for a different architecture, an administrator must create a text file that contains all the commands and applications a user would run on a command line (e.g. dockerfile) and manually build the image. Containerized images are designed to be portable across infrastructures, but are not designed to be portable across different microarchitectures, with the adoption of docker containers by multiple architectures.

SUMMARY

An embodiment of the present invention relates to a method, and associated computer system and computer program product, for tailoring container images stored in a container image registry to a specific microarchitecture that a host operating system is running on in a virtualized environment. A processor of a computing system that includes the host operating system sends a container image fetch request to the container image registry. Microarchitecture identification instructions are received from the image registry in response to the container image fetch request, the microarchitecture identification instructions configured to be run on the host operating system. Results from the microarchitecture identification instructions are transmitted to the container image registry to identify the specific microarchitecture that the host operating system is running on in the virtualized environment. A container within the virtualized environment is started using an optimal container image received from the container image registry, the optimal container image being tailored to the specific microarchitecture to leverage as many functionalities and capabilities of the specific microarchitecture of the computing system.

DETAILED DESCRIPTION

Figure 1:
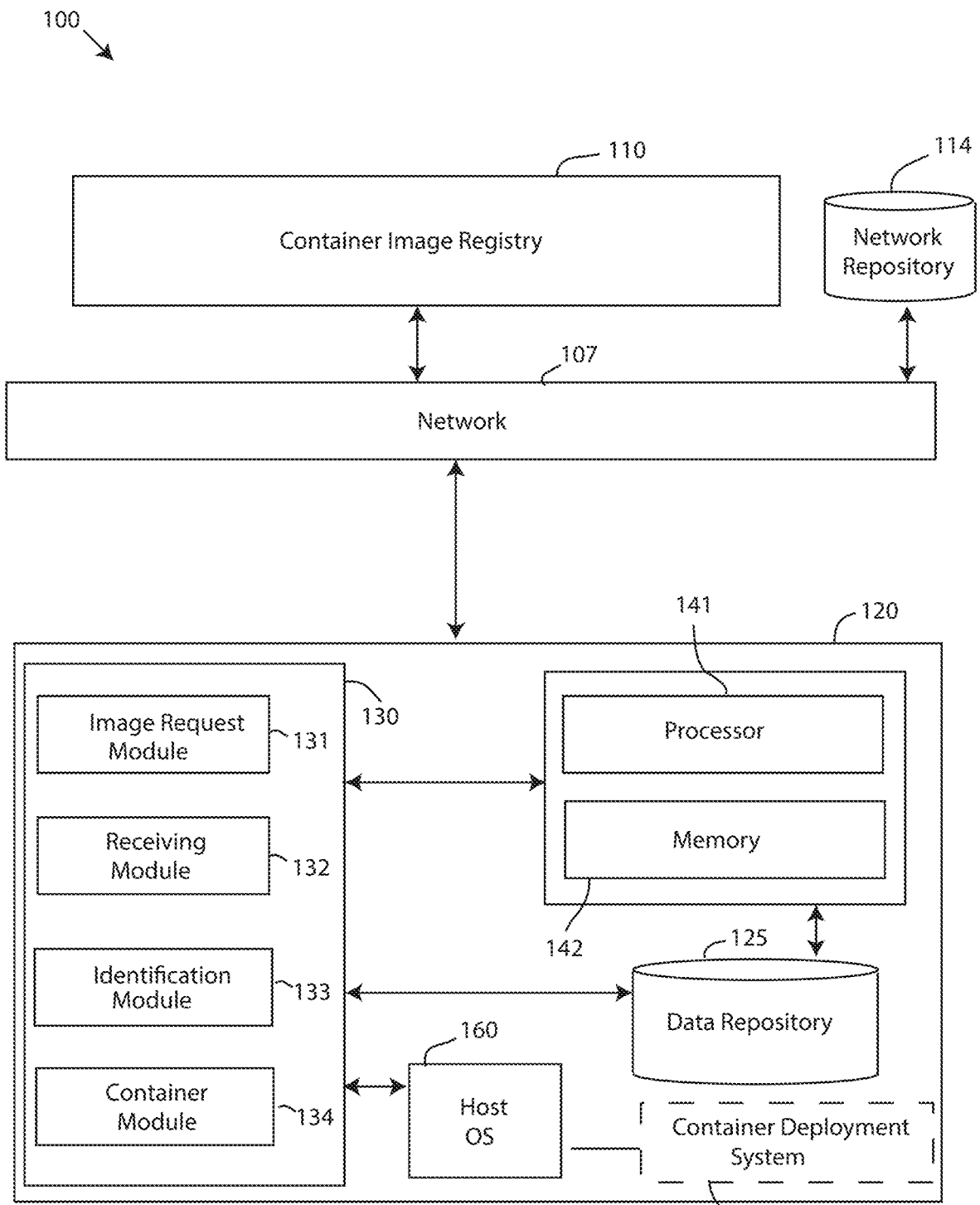
FIG. 1 depicts a block diagram of a container image system, in accordance with embodiments of the present invention.

Currently, a central image registry repository for container images cannot differentiate, nor identify distros with different microarchitectures (e.g. Skylake and Haswell). Tentative and proposed solutions only manually identify a distribution image for a main architecture and does not consider the microarchitecture of the computing system. Additionally, the central image registry does not automatically identify or build a container image for distribution. Thus, there is a need to have a more robust and portable integration between container images and architectures of computing system operating virtualized environments.

Embodiments of the present invention may include an image registry repository that identifies on which microarchitecture a container will be started. By identifying a specific microarchitecture, the image registry may automatically build (e.g. debootstrap) an image that matches the specific microarchitecture and distribute the image. For instance, an image may be built that is specifically for the microarchitecture of the computing system, therefore leveraging all functionalities of particular microarchitectures, as each microarchitecture may be better suited for particular tasks. For example, a small application that does not require single thread power may need to be deployed on a reduced instruction set computing (RISC) architecture. Embodiments of the present invention provides a new image download workflow, which may target operating system images where the build process is well-defined. For instance, based on the contents of a dockerfile and the results of hardware instructions sent by the image registry repository, embodiments of the present invention may detect the microarchitecture and automatically build an image for the specific microarchitecture. Further, embodiments of the present invention may allow a software container framework to identify which microarchitecture the host OS is running on, based on a set of instructions, and then match a better suited image. If the image registry repository does not contain an image that matches the identified microarchitecture, the image registry repository may automatically start a debootstrap/build process to build an optimal or more suitable image.

Accordingly, embodiments of the present invention may improve the functioning of containerized applications on a host OS by identifying a microarchitecture that the host OS is running on based on a technical capability and function of the microarchitecture of the computing system. Various microarchitectures exist in different types of computers, and thus creating an image tailored to the microarchitecture of the computer is a technical solution that improves the functioning of the computer and optimizes the technical functionalities and capabilities of more advanced/powerful microarchitectures and advantageously utilizes less powerful microarchitectures. Further, by distributing container images that are located or built specifically for the microarchitecture optimize the computing device and leverage the most from a processor of a given computer operating a virtualized environment.

Referring to the drawings, FIG. 1 depicts a block diagram of a container image system 100, in accordance with embodiments of the present invention. Embodiments of the container image system 100 may be a system for tailoring container images stored in a container image registry to a specific microarchitecture that a host operating system is running on in a virtualized environment. Embodiments of the container image system 100 may be useful for leveraging technical capabilities of a specific processor or microarchitecture of a particular computer running containers in a virtualized computing system. For example, the container image system 100 may improve virtual computing technology by matching container images with a specific microarchitecture of a computer. The container images system 100 may thus optimize computer resources and hardware while running containers in a virtualized environment. Embodiments of the container images system 100 may be an image creation system, an image location, and the like.

Figure 2:
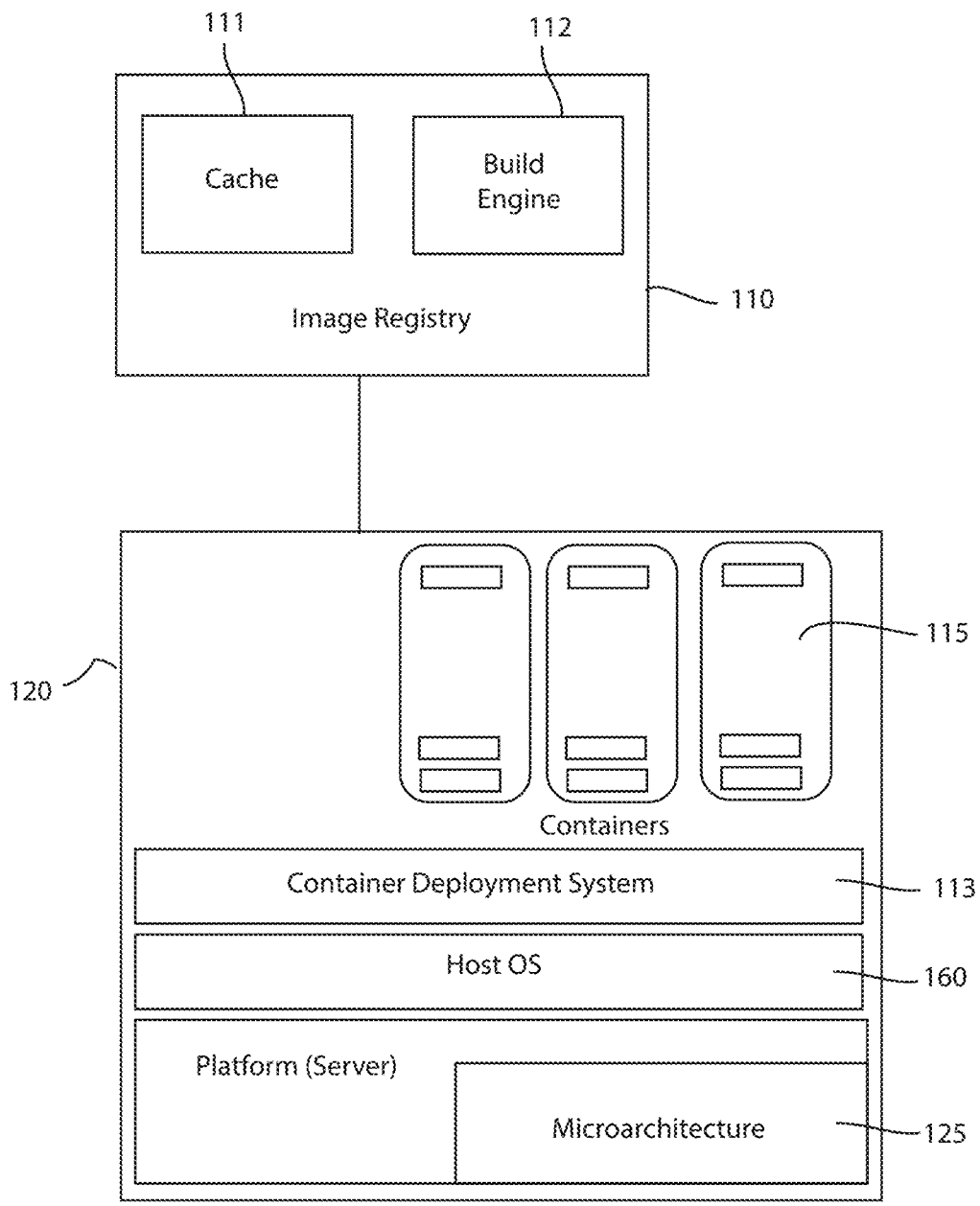
FIG. 2 depicts a block diagram of a computing system and image registry of the container image system of FIG. 1, in accordance with embodiments of the present invention.

FIG. 2 depicts a block diagram of the computing system 120 and the image registry 110 of the container image system 100 of FIG. 1, in accordance with embodiments of the present invention. Embodiments of the container image system 100 may include a computing system 120. Embodiments of the computing system 120 may be a computer system, a computer, a server, one or more servers, a platform server, one or more platform servers, a backend computing system, and the like. Embodiments of the computing system may include a microarchitecture 125. The microarchitecture 125 may be the electrical circuitry of a computer, a central processing unit, or digital signal processor that may drive the operation of the hardware operating system, such as a host OS 160 running on top of the microarchitecture 125. Each computing system 120 may have a different microarchitecture. For example, computing system 120 may have a x86 microarchitecture, an itanium microarchitecture, or the like. Embodiments of the microarchitecture 125 of the computing system 120 may be POWER 6, POWER 7, POWER 8, HASWELL, SILVERMONT, SKYLAKE, ICE LAKE, GOLDMONT, SANDY BRIDGE, or any future microarchitecture. The microarchitecture 125 for various computing systems 120 may have more or less functionalities, technical capabilities, features, speed, processing power, etc., which means that a container image designed specifically for the microarchitecture of the computing system 120 may leverage the most out of the microarchitecture 125 of the computing system 120. Moreover, embodiments of the computing system 120 may include a host OS 160. The host OS an operating system 160, which can be a computer program for controlling an operation of the computing system 120, wherein applications loaded onto the computing device 120 may run on top of the operating system 160 to provide various functions. Embodiments of the host OS 160 may be an operating system configured to run a hypervisor, which can create one or more virtual machines. Embodiments of the host OS 160 may also be an operating system that implements a container-based virtualization system, or a container deployment system 113. Embodiments of a container deployment system 113 may be configured to deploy one or more containers 115 in a virtualized environment.

Furthermore, embodiments of the container image system 100 may include an image registry 110 that is communicatively coupled to the computing system 120 over a network 107. For instance, information/data/signals/images may be transmitted to and/or received from the image registry 110 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing image information, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging information of the virtualized environment, images, hardware instructions, microarchitecture information, and the like, to generate both historical and predictive reports regarding a particular computing system 120. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the image registry 110 may be an image registry, a container image registry, an image repository, a repository, a computer, a server, an image registry repository, a container image storage device, a container image storage computing device, and the like. Embodiments of the image registry 110 may be configured to store existing/previously created container images, locate container images, and/or create/build new images based on a microarchitecture 125 of the computing system 120. Embodiments of the image registry 110 may include a cache 111 for storing container images. The cache 111 may be a hardware or software component that stores container images, for responding to container image fetch requests from computing system 120. Additionally, embodiments of the image registry 110 may have a build engine 112. The build engine 112 may be a hardware and/or software component for building a new image that matches or is optimized to a microarchitecture 125 of the computing system 120, as described in greater detail infra.

Furthermore, embodiments of the computing system 120 of the container image system 100 may be equipped with a memory device 142 which may store various data/information/code, and a processor 141 for implementing the tasks associated with the container image system 100. In some embodiments, an application 130 may be loaded in the memory device 142 of the computing system 120. Embodiments of the application 130 may be an interface, an application, a program, a module, or a combination of modules. In an exemplary embodiment, the application 130 may be a software application running on one or more back end servers, such as computing system 120, which may interface with the container deployment system 113.

Referring back to FIG. 1, the application 130 of the computing system 120 may include an image request module 131, a receiving module 132, an identification module 133, and a container module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the image request module 131 may include one or more components of hardware and/or software program code for sending a container image fetch request to the container image registry 110. For instance, embodiments of the image request module 132 may send, transmit, request, etc. a container image from the image registry 110. The image request module 131 may utilize the container deployment system 113 to initiate a container start request, which the virtualization driver may pass on to the software container. In an exemplary embodiment, a cloud management platform may call the virtualization driver (e.g. virtualization API), the virtualization driver may call the software container (e.g. HTTP API), and then the software container may submit a start request to the image registry 110 for a particular container image stored on the image registry 110 to run in the container, such as container 115 in a virtual environment. In prior systems, a central image registry repository cannot differentiate, nor identify distros with different microarchitectures, and would return an image in response to the request for download to the computer, without considering the microarchitecture of the computer, or automatically identify or create a new image based on the microarchitecture of the computer.

Embodiments of the computing system 120 may include a receiving module 132. Embodiments of the receiving module 132 may include one or more components of hardware and/or software program code for receiving microarchitecture identification instructions from the image registry 110 in response to the container image fetch request. For instance, embodiments of the image registry 110 may, in response to receiving the image fetch request, may send the microarchitecture identification instructions to be run on the host operating system 160 of the computing system 120. Embodiments of the microarchitecture identification instructions may be stored on the container image registry 110 as a binary large object (BLOB). Further, the microarchitecture identification instructions may be a platform identification program that contains a set of instructions coded to leverage specific microarchitecture functionalities. Instead of provisioning the instance with the image provided, the image registry 110 may send a set of instructions to identify the microarchitecture 125 of the computing system 120. In an exemplary embodiment, the microarchitecture instructions may have the sole goal of identifying which microarchitecture the hypervisor is running on the host OS 160 of the computing system 120. The host OS 160 may automatically run the instructions sent by the image registry 110.

Referring still to FIG. 1, embodiments of the computing system 120 may include an identification module 133. Embodiments of the identification module 133 may include one or more components of hardware and/or software program for transmitting results from the microarchitecture identification instructions to the container image registry 110 to identify the specific microarchitecture that the host operating system 160 is running on in the virtualized environment. The results of the microarchitecture identification instructions may be used to determine the specific microarchitecture 125 of the computing system 120. The microarchitecture identification instructions may be hardware instructions to test whether a particular hardware component or functionality exists in the microarchitecture 125. For example, the microarchitecture identification instructions may test whether a microarchitecture 125 has a hardware transaction memory, or if the microarchitecture has a cryptographic acceleration, or any other hardware component or technical capability. If the microarchitecture 125 contains particular features, such as a hardware transaction memory, the image registry 110 may then be able to identify the microarchitecture 125, and utilize this determination to respond with and/or build a container image that will allow the computing system 120 to run much faster operations in the virtualization environment. To identify the specific microarchitecture 125, the image registry 110 may analyze the results of the microarchitecture identification instructions transmitted by the identification module 133 of the computing system 120, and may discard instructions which returned illegal instructions. If illegal instructions are returned for a particular instruction or test, then the image registry 110 may determine that a particular hardware component and/or functionality does not exist within the microarchitecture 125. Based on the discarded illegal instructions and the successful instructions, the image registry 110 can identify the specific microarchitecture 125 of the computing system 120. In an exemplary embodiment, the image registry 110 may store various microarchitecture information (e.g. in the cache 111) for comparison with the detected microarchitecture 125 of the computing system 120.

Embodiments of the computing system 120 may include a container module 134. Embodiments of the purchasing module 134 may include one or more components of hardware and/or software program for starting a container 115 within the virtualized environment using an optimal container image received from the container image registry 110. Embodiments of the optimal container image may be tailored to the specific microarchitecture 125 to leverage as many functionalities and capabilities of the specific microarchitecture 125 of the computing system 120. For instance, in response to detecting and verifying an identity of the microarchitecture 125, embodiments of the image registry 110 may verify if an image matching or otherwise optimized with the specific, detected microarchitecture 125 to run the container 115 is located on the cache 111. In an exemplary embodiment, the container image registry 110 may check a cache 111 of the container image registry 110 to determine whether an optimal container image is already built and stored on the cache 111, for sending to the host operating system. If there is no existing matching image, the image registry 110 may initiate a bootstrapping process, which is the process of building an image from scratch. In an exemplary embodiment, when the container image registry 110 checks a cache 111 of the container image registry 110 and determines that the optimal container image is not already built and stored on the cache 111, the container image registry 110 may build the optimal container image from scratch, on demand. The optimal container image may be built using a bootstrapping process, wherein the source code can be used to build the same application for a particular feature. For example, the image registry 110 may discover that the computing system 120 having a hierarchical temporal memory (HTM, but there is no binary; the image registry 110 in this case may build the image (websphere) as a compilation parameter, specifically compiling websphere using the HTM feature. After the container image is built or identified on the registry cache 111, the most suitable or optimal container image may be downloaded by the container module 134 and be used for starting the container 115. Accordingly, the software container framework can identify which microarchitecture the host is running on (e.g. based on the blob instructions), and based on the results of the blob instructions, a better suited image may be matched with the specific microarchitecture 125, and if the image is not stored on the image registry 110, the image registry 110 may automatically start the debootstrap/build process to create a new, optimum container image to be used by the computing system 120 to start a container 115 in a virtualized computing environment.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the container image system 100 improve container-based virtualization technology by tailoring container images to the capabilities of the microarchitecture of the computing system running the virtual environment. The container-based virtualization environment is improved by the present invention because the container running in the virtual environment may run smoother, faster, and be able to implement more technical capabilities by taking advantage of the specific microarchitecture of the computing system.

Furthermore, the container image system 100 provides a technical solution to the above-drawbacks by tailoring a newly built container image to the microarchitecture of the computing system. The technical solution(s) described herein is necessarily rooted in computer technology in order to overcome a problem specifically arising in the realm of container-based virtualization and container operation in virtual environments.

Figure 3:
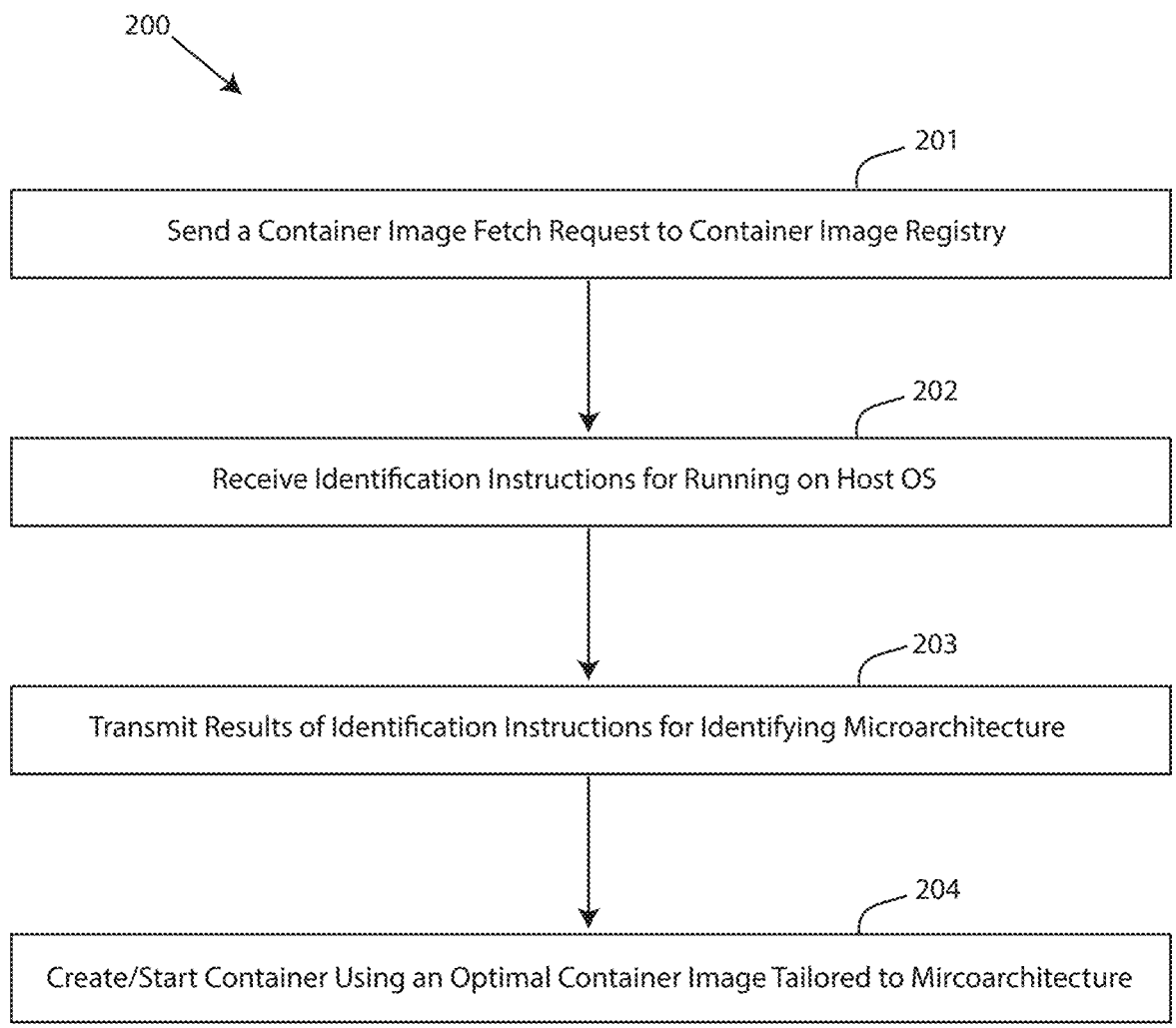
FIG. 3 depicts a flow chart of a method for tailoring container images stored in a container image registry to a specific microarchitecture that a host operating system is running on in a virtualized environment, in accordance with embodiments of the present invention.

Referring now to FIG. 3, which depicts a flow chart of a method 200 for tailoring container images stored in a container image registry to a specific microarchitecture that a host operating system is running on in a virtualized environment, in accordance with embodiments of the present invention. One embodiment of a method 200 or algorithm that may be implemented for tailoring container images stored in a container image registry to a specific microarchitecture that a host operating system is running on in a virtualized environment with the container image system 100 described in FIGS. 1-2 using one or more computer systems as defined generically in FIG. 6 below, and more specifically by the specific embodiments of FIG. 1.

Embodiments of the method 200 for tailoring container images stored in a container image registry to a specific microarchitecture that a host operating system is running on in a virtualized environment, in accordance with embodiments of the present invention, may begin at step 201 wherein a container image fetch request is sent to a container image registry. Step 202 receives microarchitecture instructions for running on the host operating system. Step 203 transmits results of the microarchitecture identification instructions for identifying the specific microarchitecture of the computing system, to the image registry. Step 204 starts the container using an optimal container image tailored to the microarchitecture of the computing system, wherein the optimal container image is either located in a cache of the image registry, or automatically built by a build engine of the image registry, in response to the image fetch request.

Figure 4:
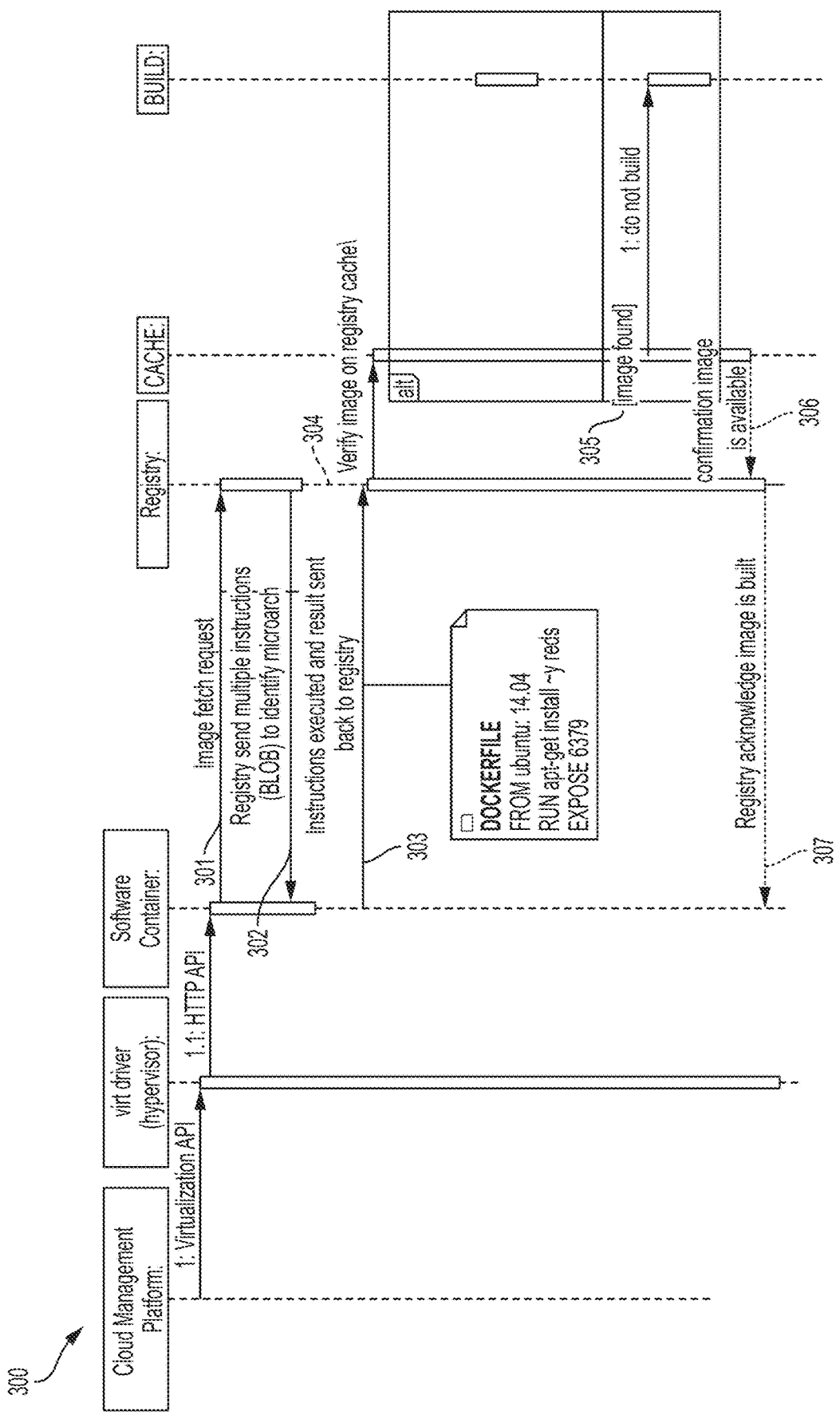
FIG. 4 depicts a flow chart diagram of a method for identifying the microarchitecture and locating an optimal container image in a cache of the image registry, in accordance with embodiments of the present invention.

FIG. 4 depicts a flow chart diagram of a method 300 for identifying the microarchitecture and locating an optimal container image in a cache of the image registry, in accordance with embodiments of the present invention. At step 301, an image fetch request is sent from the computing system having the container deployment system, to the image registry. At step 302, the image registry sends multiple instructions (e.g. BLOB) used to identify the microarchitecture of the computing system. At step 303, the instructions are executed, and the results are sent back to the image registry from the computing system. The image registry then analyzes the results to identify the microarchitecture. At step 304, the image registry verifies or otherwise determines whether the optimal container images is already built and stored on the image registry. At step 305, the optimal container image is located on the image registry. At step 306, a confirmation that the optimal container image is available may be generated. At step 307, the image registry sends the optimal container image to the computing system for starting the container in a virtualized environment.

Figure 5:
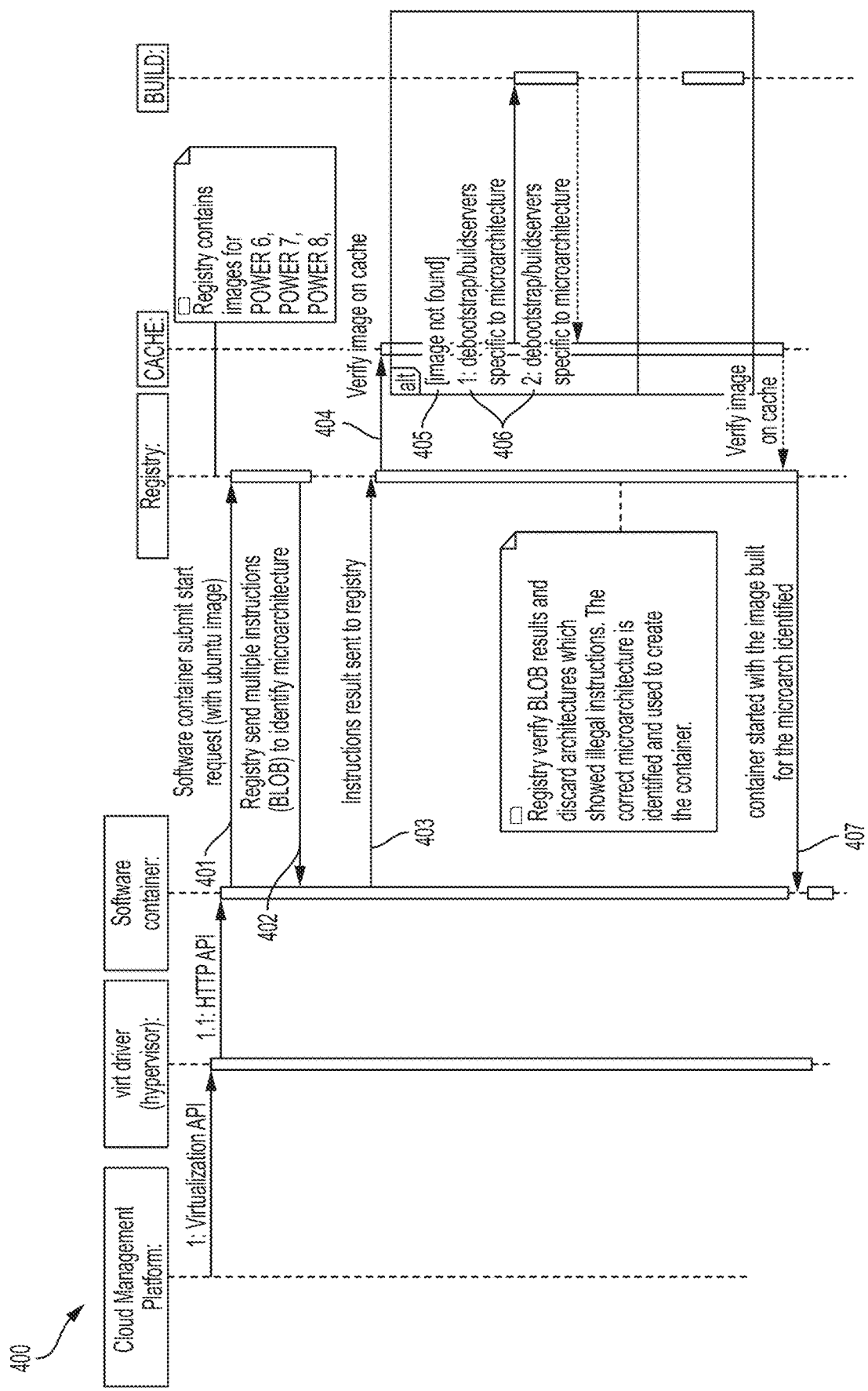
FIG. 5 depicts a flow chart diagram of a method for identifying the microarchitecture and building an optimal container image in a cache of the image registry, in accordance with embodiments of the present invention.

FIG. 5 depicts a flow chart diagram of a method 400 for identifying the microarchitecture and building an optimal container image in a cache of the image registry, in accordance with embodiments of the present invention. At step 301, an image fetch request is sent from the computing system having the container deployment system, to the image registry. In an exemplary embodiment, the software container may submit a start request (e.g. with an Ubuntu image). At step 402, the image registry sends multiple instructions (e.g. BLOB) used to identify the microarchitecture of the computing system. At step 403, the instructions are executed, and the results are sent back to the image registry from the computing system. The image registry then analyzes the results to identify the microarchitecture. At step 404, the image registry verifies or otherwise determines whether the optimal container images is already built and stored on the image registry. At step 405, the image registry determines that an optimal container image is not located on the image registry (e.g. not found). At step 406, a debootstrap process is initiated and the optimal container image is built on the image registry. At step 407, the image registry sends the optimal container image to the computing system for starting the container in a virtualized environment.

Figure 6:
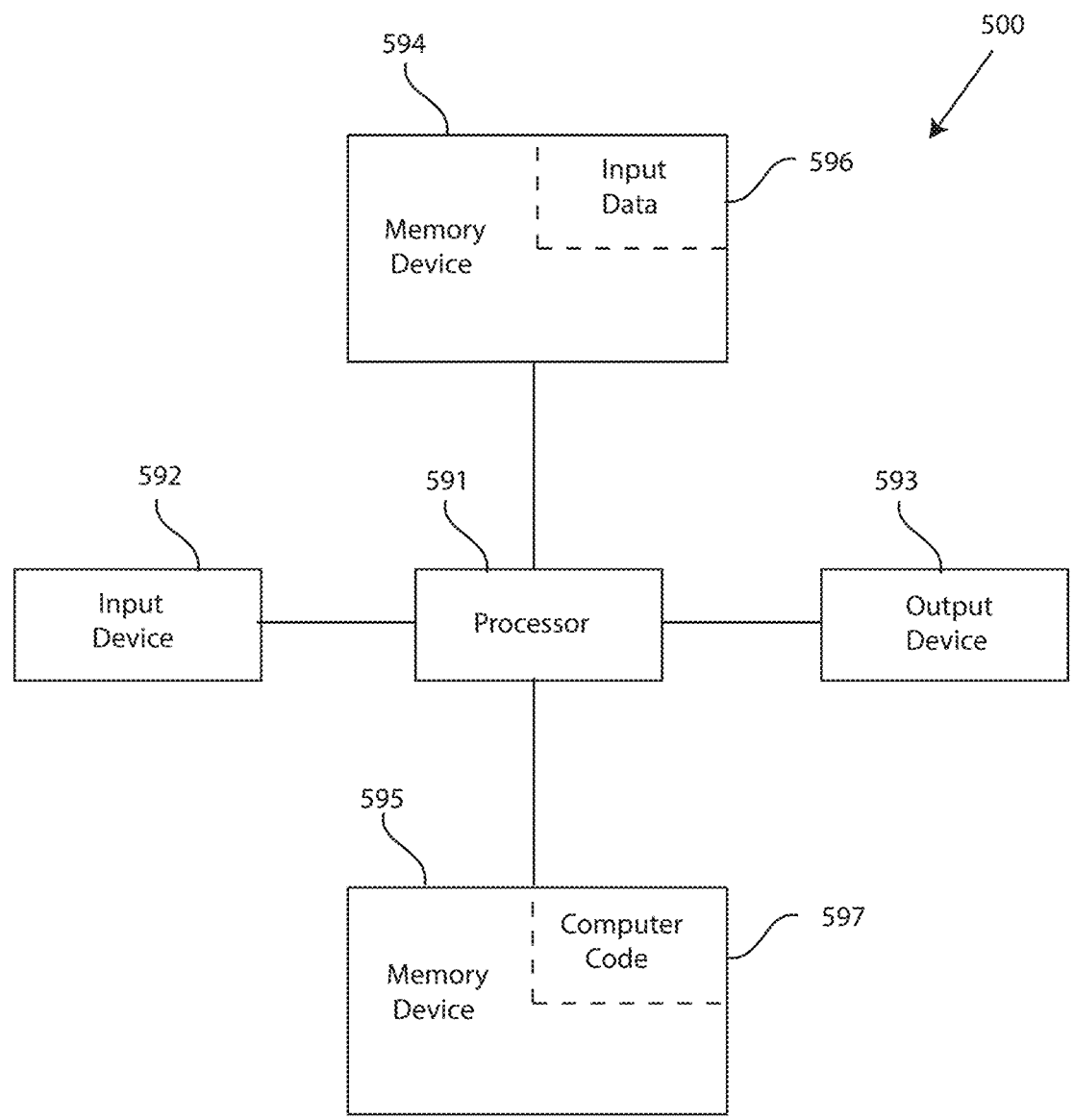
FIG. 6 depicts a block diagram of a computer system for the container image system 100 of FIGS. 1-2, capable of implementing methods method for tailoring container images stored in a container image registry to a specific microarchitecture that a host operating system is running on in a virtualized environment of FIGS. 3-5, in accordance with embodiments of the present invention.

FIG. 6 depicts a block diagram of a computer system for the container system 100 of FIGS. 1-2, capable of implementing methods method for tailoring container images stored in a container image registry to a specific microarchitecture that a host operating system is running on in a virtualized environment of FIGS. 3-5, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for tailoring container images stored in a container image registry to a specific microarchitecture that a host operating system is running on in a virtualized environment in the manner prescribed by the embodiments of FIGS. 3-5 using the container image system 100 of FIGS. 1-2, wherein the instructions of the computer code 597 may be executed by processor 591 via memory device 595. The computer code 597 may include software or program instructions that may implement one or more algorithms for implementing the method for tailoring container images stored in a container image registry to a specific microarchitecture that a host operating system is running on in a virtualized environment, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 6.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to tailoring container image systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to tailor container images stored in a container image registry to a specific microarchitecture that a host operating system is running on in a virtualized environment. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for tailoring container images stored in a container image registry to a specific microarchitecture that a host operating system is running on in a virtualized environment. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for tailoring container images stored in a container image registry to a specific microarchitecture that a host operating system is running on in a virtualized environment.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
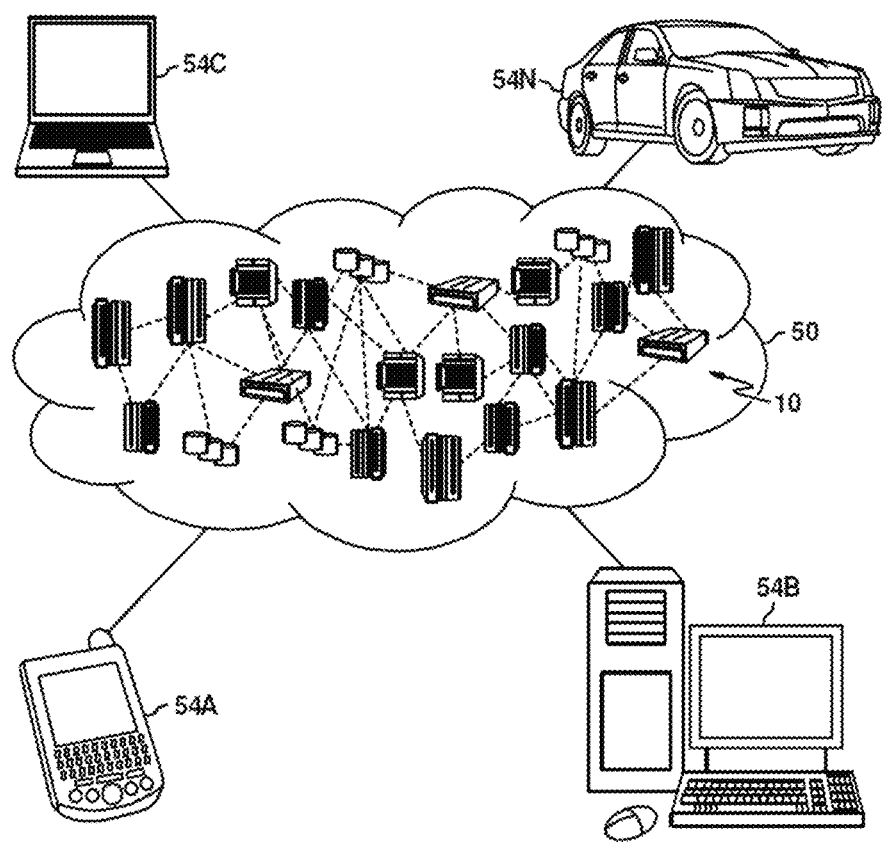
FIG. 7 depicts a cloud computing environment, in accordance with embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 7 are intended to be illustrative only and that computing nodes 10 and cloud computing environment 50 can communicate with any type of computerized device over any type of network and/or network addressable connection (e.g., using a web browser).

Figure 8:
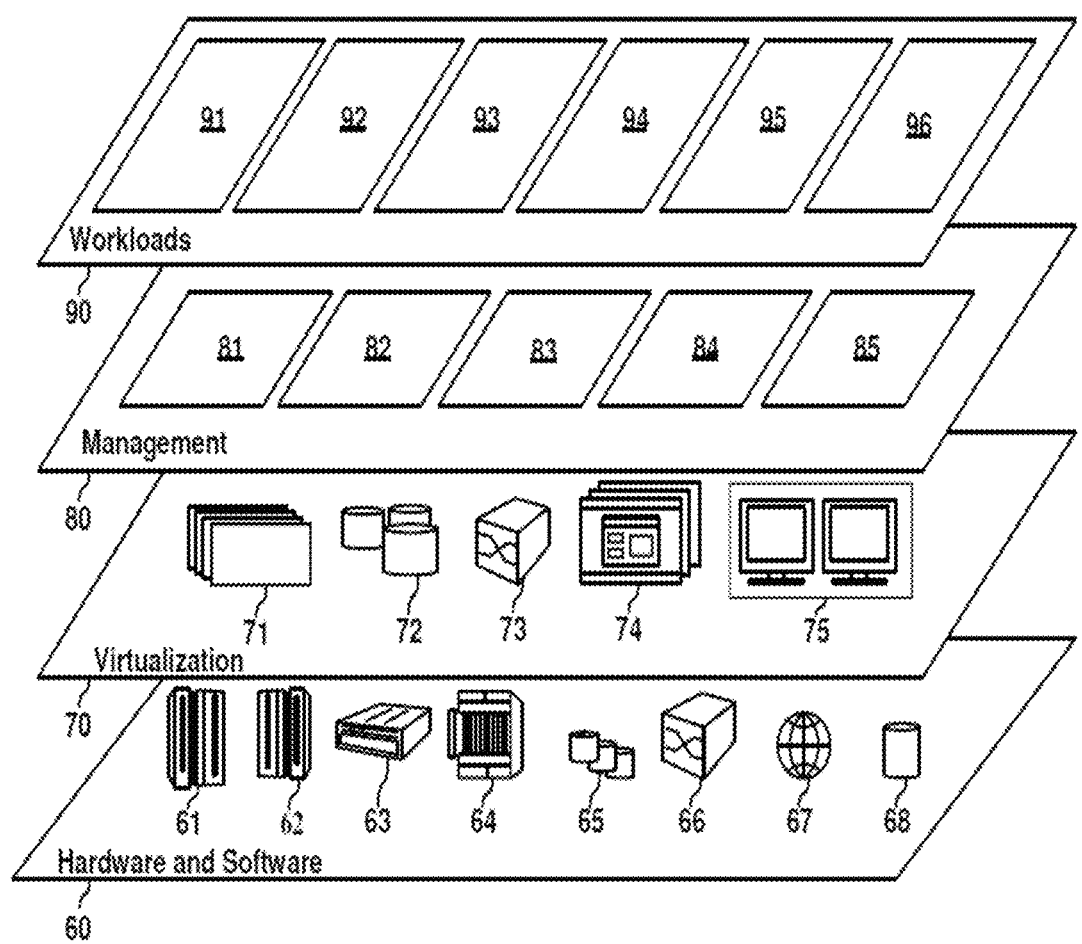
FIG. 8 depicts abstraction model layers, in accordance with embodiments of the present invention.

Referring now to FIG. 8, a set of functional abstraction layers provided by cloud computing environment 50 (see FIG. 7) are shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and container image tailoring 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for tailoring container images stored in a container image registry to a specific microarchitecture that a host operating system is running on in a virtualized environment, the method comprising:

forwarding, by the container image registry in response to a container image fetch request by a computing system that includes the host operating system and prior to a forwarding of the container image, microarchitecture identification instructions, the microarchitecture identification instructions having a set of hardware instructions separate from the container image that are configured to be run on the host operating system, each hardware instruction of the set of hardware instructions being directed to a different specific potential feature that is provided by one microarchitecture of a plurality of microarchitectures but is not provided by another microarchitecture of the plurality of microarchitectures;

analyzing, by the container image registry, results from the microarchitecture identification instructions transmitted to the container image registry to identify each specific potential feature provided by the specific microarchitecture that the host operating system is running on in the virtualized environment by determining, for a result corresponding to each hardware instruction, whether a hardware component or functionality comprising the specific potential feature to which the hardware instruction is directed exists in the microarchitecture, wherein when illegal instructions are returned as a result of the hardware instruction, the specific feature does not exist within the microarchitecture, and wherein when successful instructions are returned as a result of the hardware instruction, the specific feature exists within the microarchitecture;

identifying, by the image registry, the microarchitecture of the computing system from the plurality of microarchitectures based on a combination of each specific potential feature identified as existing within the microarchitecture and each specific potential hardware identified as not existing within the microarchitecture;

automatically building, by the image registry, an optimal container image tailored to the specific microarchitecture, as a function of the container image fetch request, by compiling a requested application into a container image that has source code that incorporates each specific potential feature identified as existing within the microarchitecture; and delivering, by the image registry to the computer system, a container that executes within the virtualized environment using the optimal container image automatically built.

2. The method of claim 1, wherein the container image registry checks a cache of the container image registry to determine that the optimal container image is not already built and stored on the cache, prior to automatically building the optimal container image.

3. The method of claim 1, wherein, the container image registry builds the optimal container image from scratch.

4. The method of claim 3, wherein the optimal container image is built by initiating a bootstrapping process to build the optimal container image on demand, based on the identified microarchitecture.

5. The method of claim 1, wherein the microarchitecture identification instructions are stored on the container image registry as a binary large object (BLOB).

6. The method of claim 1, wherein the microarchitecture identification instructions is a platform identification program that contains a set of instructions coded to leverage specific microarchitecture functionalities.

7. The method of claim 6, wherein the platform identification program discards instructions which returned illegal instructions to identify the specific microarchitecture.

8. A computing system, comprising:
   a processor;
   a memory device coupled to the processor; and
   a computer readable storage device coupled to the processor, wherein the storage device contains program code executable by the processor via the memory device to implement a method for tailoring container images stored in a container image registry to a specific microarchitecture that a host operating system is running on in a virtualized environment, the method comprising:

forwarding, by the container image registry in response to a container image fetch request by a computing system that includes the host operating system and prior to a forwarding of the container image, microarchitecture identification instructions, the microarchitecture identification instructions having a set of hardware instructions separate from the container image that are configured to be run on the host operating system, each hardware instruction of the set of hardware instructions being directed to a different specific potential feature that is provided by one microarchitecture of a plurality of microarchitectures but is not provided by another microarchitecture of the plurality of microarchitectures;

analyzing, by the container image registry, results from the microarchitecture identification instructions transmitted to the container image registry to identify each specific potential feature provided by the specific microarchitecture that the host operating system is running on in the virtualized environment by determining, for a result corresponding to each microarchitecture identification instruction, whether a hardware component or functionality comprising the specific potential feature to which the microarchitecture identification instruction is directed exists in the microarchitecture, wherein when illegal instructions are returned as a result of the microarchitecture identification instructions, the specific feature does not exist within the microarchitecture, and wherein when successful instructions are returned as a result of the microarchitecture identification instructions, the specific feature exists within the microarchitecture;

identifying, by the image registry, the microarchitecture of the computing system from the plurality of microarchitectures based on a combination of each specific potential feature identified as existing within the microarchitecture and each specific potential hardware identified as not existing within the microarchitecture;

automatically building, by the image registry, an optimal container image tailored to the specific microarchitecture, as a function of the container image fetch request, by compiling a requested application into a container image that has source code that incorporates each specific potential feature identified as existing within the microarchitecture; and delivering, by the image registry to the computer system, a container that executes within the virtualized environment using the optimal container image automatically built.

9. The computer system of claim 8, wherein the container image registry checks a cache of the container image registry to determine that the optimal container image is not already built and stored on the cache, prior to automatically building the optimal container image.

10. The computer system of claim 8, wherein, the container image registry builds the optimal container image from scratch.

11. The computer system of claim 10, wherein the optimal container image is built by initiating a bootstrapping process to build the optimal container image on demand, based on the identified microarchitecture.

12. The computer system of claim 8, wherein the microarchitecture identification instructions are stored on the container image registry as a binary large object (BLOB).

13. The computer system of claim 8, wherein the microarchitecture identification instructions is a platform identification program that contains a set of instructions coded to leverage specific microarchitecture functionalities.

14. The computer system of claim 13, wherein the platform identification program discards instructions which returned illegal instructions to identify the specific microarchitecture.

15. A computer program product, comprising a computer readable hardware storage device storing a computer readable program code, the computer readable program code comprising an algorithm that when executed by a computer processor of a computing system implements a method for tailoring container images stored in a container image registry to a specific microarchitecture that a host operating system is running on in a virtualized environment, the method comprising:

forwarding, by the container image registry in response to a container image fetch request by a computing system that includes the host operating system and prior to a forwarding of the container image, microarchitecture identification instructions, the microarchitecture identification instructions having a set of hardware instructions separate from the container image that are configured to be run on the host operating system, each hardware instruction of the set of hardware instructions being directed to a different specific potential feature that is provided by one microarchitecture of a plurality of microarchitectures but is not provided by another microarchitecture of the plurality of microarchitectures;

analyzing, by the container image registry, results from the microarchitecture identification instructions transmitted to the container image registry to identify each specific potential feature provided by the specific microarchitecture that the host operating system is running on in the virtualized environment by determining, for a result corresponding to each microarchitecture identification instruction, whether a hardware component or functionality comprising the specific potential feature to which the microarchitecture identification instruction is directed exists in the microarchitecture, wherein when illegal instructions are returned as a result of the microarchitecture identification instructions, the specific feature does not exist within the microarchitecture, and wherein when successful instructions are returned as a result of the microarchitecture identification instructions, the specific feature exists within the microarchitecture;

identifying, by the image registry, the microarchitecture of the computing system from the plurality of microarchitectures based on a combination of each specific potential feature identified as existing within the microarchitecture and each specific potential hardware identified as not existing within the microarchitecture;

automatically building, by the image registry, an optimal container image tailored to the specific microarchitecture, as a function of the container image fetch request, by compiling a requested application into a container image that has source code that incorporates each specific potential feature identified as existing within the microarchitecture; and delivering, by the image registry to the computer system, a container that executes within the virtualized environment using the optimal container image automatically built.

16. The computer program product of claim 15, wherein the container image registry checks a cache of the container image registry to determine that the optimal container image is not already built and stored on the cache, prior to automatically building the optimal container image.

17. The computer program product of claim 15, wherein, the container image registry builds the optimal container image from scratch.

18. The computer program product of claim 17, wherein the optimal container image is built by initiating a bootstrapping process to build the optimal container image on demand, based on the identified microarchitecture.

19. The computer program product of claim 15, wherein the microarchitecture identification instructions is a platform identification program that contains a set of instructions coded to leverage specific microarchitecture functionalities.

20. The computer program product of claim 19, wherein the platform identification program discards instructions which returned illegal instructions to identify the specific microarchitecture.

* * * * *